(12) United States Patent
Lee et al.

(10) Patent No.: US 8,913,013 B2
(45) Date of Patent: Dec. 16, 2014

(54) KEYBOARD

(75) Inventors: Guo-Chen Lee, Taoyuan (TW); Jerry Wu, Taoyuan (TW); Yu-Jeng Lin, Taoyuan (TW); Tsung-Yung Hung, Taoyuan (TW); I-Ping Huang, Taoyuan (TW)

(73) Assignee: Global Lighting Technology Inc., Taoyuan (TW)

( * ) Notice: Subject to any disclaimer, the term of this patent is extended or adjusted under 35 U.S.C. 154(b) by 572 days.

(21) Appl. No.: 13/241,261

(22) Filed: Sep. 23, 2011

(65) Prior Publication Data

US 2012/0113013 A1 May 10, 2012

(30) Foreign Application Priority Data

Nov. 9, 2010 (TW) ................................ 99138530 A
Mar. 28, 2011 (TW) .............................. 100110606 A

(51) Int. Cl.
*G09G 5/00* (2006.01)
*G06F 3/02* (2006.01)

(52) U.S. Cl.
CPC ................................. *G06F 3/0202* (2013.01)
USPC ........................... 345/170; 345/156; 345/171

(58) Field of Classification Search
USPC .......................................... 345/170, 156, 171
See application file for complete search history.

(56) References Cited

U.S. PATENT DOCUMENTS

| | | | | |
|---|---|---|---|---|
| 7,604,365 B2 * | 10/2009 | Chang | ......................... | 362/97.1 |
| 2011/0147182 A1 * | 6/2011 | Chen | ............................. | 200/314 |
| 2012/0139843 A1 * | 6/2012 | Shipman et al. | .............. | 345/170 |

* cited by examiner

*Primary Examiner* — William Boddie
*Assistant Examiner* — Leonid Shapiro
(74) *Attorney, Agent, or Firm* — CKC & Partners Co., Ltd.

(57) ABSTRACT

A keyboard comprises a key module and a backlight module in which the key module comprises a light-transmissive key part and an electric circuit substrate, and the backlight module comprises a light guide plate, a reflection unit and at least one light source. The backlight module is disposed between the key part and the electric circuit substrate. Thus, lights emitted by the light source are projected into the light guide plate from the lateral side of the light guide plate, and the lights are reflected by the reflection unit for directly passing through the light output surface of the light guide plate and the key part.

13 Claims, 12 Drawing Sheets

KEYBOARD

RELATED APPLICATIONS

This application claims priority to Taiwanese Application Serial Number 099138530, filed Nov. 9, 2010, and Taiwanese Application Serial Number 100110606, filed Mar. 28, 2011, which are herein incorporated by reference.

BACKGROUND

1. Technical Field

The present invention relates to an input device connected to or installed on an electronic device such as a computer or mobile phone, more particularly to a keyboard having light emitting function.

2. Description of Related Art

A keyboard installed on a conventional notebook computer or desktop computer is not equipped with a light emitting function, but with the technology development of the backlight module, some manufacturers have installed a light emitting device in a keyboard, thereby the keyboard is not only provided with an illumination effect, but also provided with a decorative function.

A conventional light-emitting keyboard comprises a key module and a backlight module. The key module comprises a base board on which at least one light-transmissive key capable of up/down moving relative to the base board is installed; the backlight module is installed below the key module and fastened with the key module. Accordingly, the backlight module can provide light from the bottom of the key module, and the light can penetrate the light-transmissive key for enabling the key to generate the light emitting effect. Because the market trend of electronic products is to be smaller and thinner, thus at present, beside providing the light emitting effect to the light-emitting keyboard, the requirement of reducing the thickness of keyboard also has to be considered.

The conventional art is to provide a thin standard keyboard, the structure thereof comprises an electric circuit substrate installed on a base board and a transparent board, the transparent board is provided with a light guide plate, and a light source is electrically connected to the electric circuit substrate. The light source can project light from a lateral side of the light guide plate for entering the light guide plate; an outer membrane having a plurality of key caps is installed on the outermost layer of the keyboard. When one of the key caps of the outer membrane is pressed, the key cap presses on a membrane switch formed on the electric circuit substrate through a corresponding elastic element, so a key signal is outputted. Wherein the base board and the electric circuit substrate has a reflection board, so a part of the light emitted by the light source can be reflected by the base board for passing through the electric circuit substrate then penetrating the light guide plate and the outer membrane, thereby presenting a light emitting effect.

However, the light permeability of the electric circuit substrate is poor, and the reflected light has to pass through various mediums then eventually be emitted out from the outer membrane, the light quantity reflecting out from the outer membrane is greatly reduced, thereby lowering the light emitting efficiency of the whole keyboard.

Moreover, the structure of installing the elastic element below the key module is complicated, so the assembly cost is affected. After the elastic element is installed in the key module, the elastic element may be shaken or displaced due to poor positioning and dislocation of the elastic element may occur.

SUMMARY

One object of the present invention is to solve the disadvantages of conventional light-emitting keyboard structure in which light being obstructed by a lot of mediums before outputting from the light guide plate, thereby the light quantity passing through the keys is reduced, and the light emitting efficiency of the whole keyboard is not able to be further enhanced.

One feature of the present invention is that: in a backlight module included in the light-emitting keyboard, a reflection unit is directly installed on a rear surface opposite to the light output surface of a light guide plate, an electric circuit substrate is installed on a rear surface opposite to the reflection surface of the reflection unit, so after light is projected from the lateral side of the light guide plate for entering the light guide plate, the light can be reflected by the reflection unit for directly passing through the light guide plate and a key part, such that the reflected light is obstructed by less mediums, thereby enhancing the light quantity outputted from the key part.

One solution provided by the present invention is to provide a keyboard, which comprises a key module and a backlight module, wherein the key module comprises a light-transmissive key part and an electric circuit substrate, the backlight module comprises a light guide plate, a reflection unit and at least one light source. The backlight module is disposed between the key part and the electric circuit substrate, so a light output surface of the light guide plate is enabled to face the key part, and the reflection unit is enabled to face a rear surface opposite to the light output surface of the light guide plate. The light source is electrically connected to the electric circuit substrate, and the light source faces a light incident surface defined at a lateral side of the light guide plate, so the light emitted through electrically charging the light source is projected into the light guide plate from the lateral side, and the light is reflected by the reflection unit for directly passing through the light guide plate and the key part, thereby the light is obstructed by less mediums and the light quantity passing through the key part is increased.

According to the present invention, the key module of the light-emitting keyboard is suitable to be used with a flexible key membrane having a plurality of key caps.

According to the present invention, the backlight module of the light-emitting keyboard adopts LED as the light source, for reducing the volume of the backlight module and the whole keyboard.

According to the light-emitting keyboard provided by the present invention, the key module and the backlight module are jointly installed on a base.

According to one embodiment of the present invention, the light guide plate and the reflection unit of the backlight module can be respectively formed with a plurality of corresponding penetrated holes and through holes, and an elastic element is installed in each corresponding penetrated hole and through hole, and the rear surface of the key part is installed with a plurality of protrusions corresponding to the locations of the elastic elements, so when a key cap is pressed, the elastic element is pressed by the protrusion to deform for actuating an electric switch to output a key signal.

According to one embodiment of the present invention, the reflection unit of the backlight module is formed with a plurality of through holes, and an elastic element is installed in each through hole, and the elastic elements are connected to the rear surface of the light guide plate, and the rear surface of the key part is installed with a plurality of protrusions corresponding to the locations of the elastic elements, so when a key cap is pressed, the elastic element is pressed by the protrusion to deform for actuating an electric switch to output a key signal.

According to the present invention, in the backlight module, a plurality of elastic elements are connected to the reflection unit corresponding to the locations of the elastic elements, and the rear surface of the light guide plate is installed with a plurality of protrusions corresponding to the locations of the elastic elements, so when a key cap is pressed, the elastic element is pressed by the protrusion to deform for actuating an electric switch to output a key signal.

Another object of the present invention is to improve the structure of the mentioned conventional light-emitting keyboard in which the installation of an elastic element serving to recover a key cape is complicated, thereby raising the assembly cost.

One another object of the present invention is to position an elastic element in a penetrated hole of a light guide plate or a through hole of a reflection unit, so the elastic element is prevented from shaking or moving in the penetrated hole and/or the through hole, so dislocation is avoided.

According to one embodiment of the present invention, the present invention further comprises at least one fixing unit for fixing the elastic elements in the penetrated holes of the light guide plate.

One feature of this embodiment is to utilize an adhesive member as the fixing unit, for adhering and fixing the elastic elements on the reflection unit or the light guide plate of the backlight module.

According to one embodiment of the present invention, the reflection unit of the backlight module is formed with a plurality of through holes, and an elastic element is installed in each through hole, and an adhesive member serving as the fixing unit is provided on the reflection unit for fixing the elastic elements on the reflection unit; and the rear surface of the key part is installed with a plurality of protrusions corresponding to the locations of the elastic elements, so when a key cap is pressed, the elastic element is pressed by the protrusion to deform for actuating an electric switch to output a key signal.

According to one embodiment of the present invention, the adhesive member of the fixing unit can be an adhesive tape or glue.

BRIEF DESCRIPTION OF THE DRAWINGS

The present invention will be apparent to those skilled in the art by reading the following detailed description of a preferred embodiment thereof, with reference to the attached drawings, in which.

DESCRIPTION OF THE PREFERRED EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
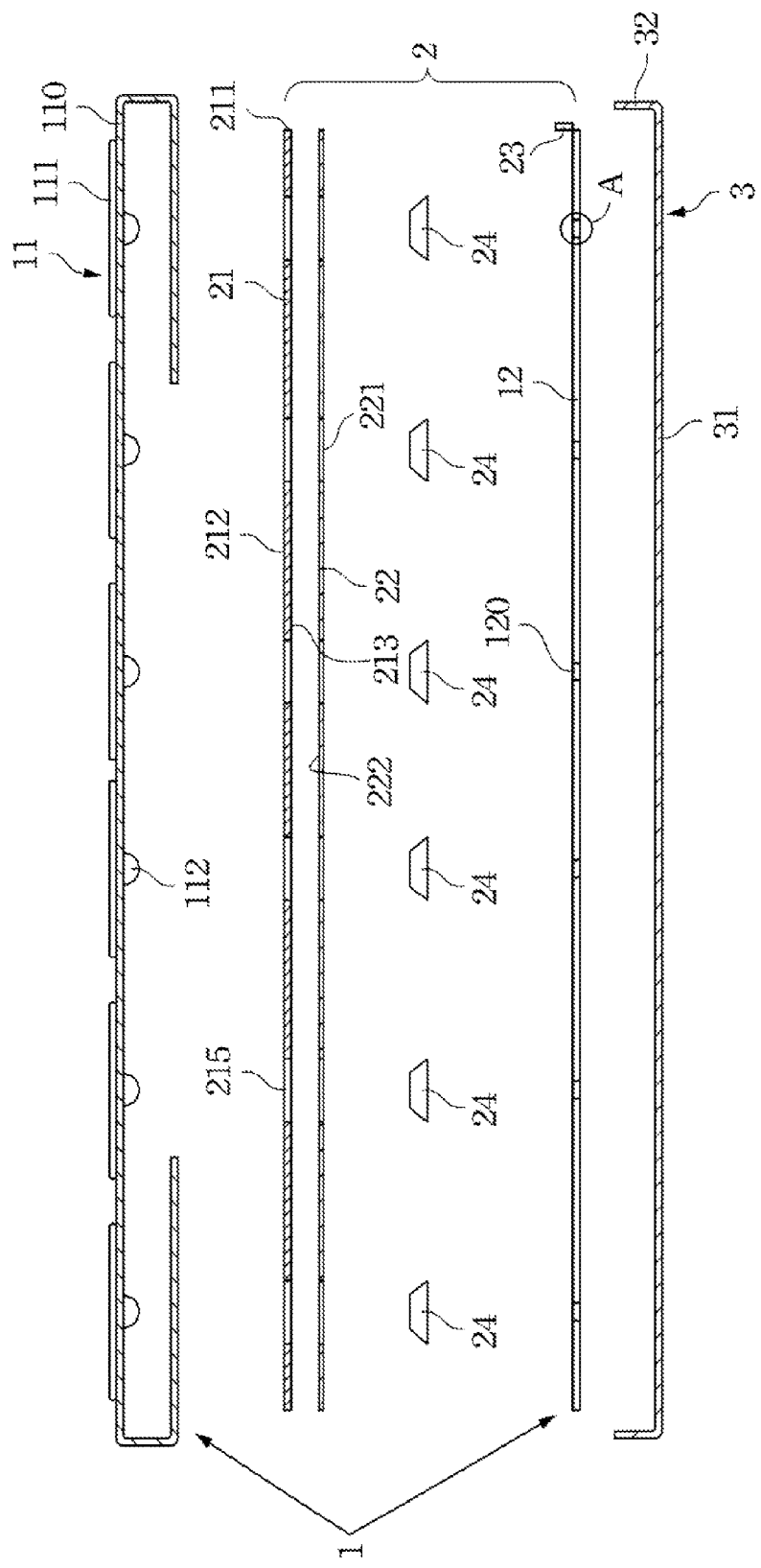
FIG. 1 is a plane cross exploded view showing the assembly relation of main components of the light-emitting keyboard according to the first embodiment of the present invention.
Figure 2:
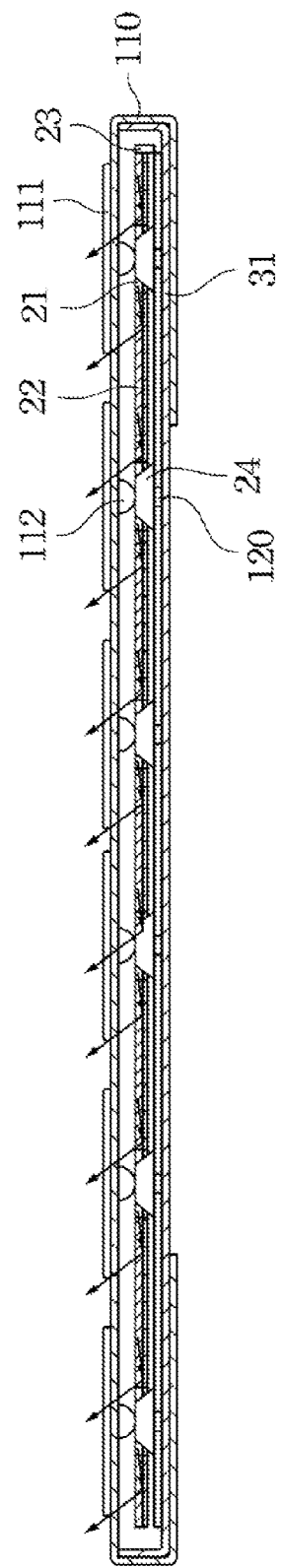
FIG. 2 is a plane cross view showing the assembly structure of the light-emitting keyboard according to the first embodiment of the present invention.

FIG. 1 and FIG. 2 show the light-emitting keyboard according to the first embodiment of the present invention. The light-emitting keyboard provided by the present invention comprises a key module 1 and a backlight module 2. The key module 1 is further installed with a key part 11 and an electric circuit substrate 12. The key part 11 is flexible and installed with a plurality of key caps 111 on the top surface, the bottom surface is installed with a key membrane 110 having a plurality of protrusions 112. The key membrane 110 can be a membrane made of thermoplastic polyurethane (TPU) material, and the protrusions 112 can adopt the same or different material relative to the key membrane 110. The key part 11 is made of a light-transmissive material, and is provided with texts, patterns, or symbols of the keyboard which are preset on the key caps.

Figure 3:
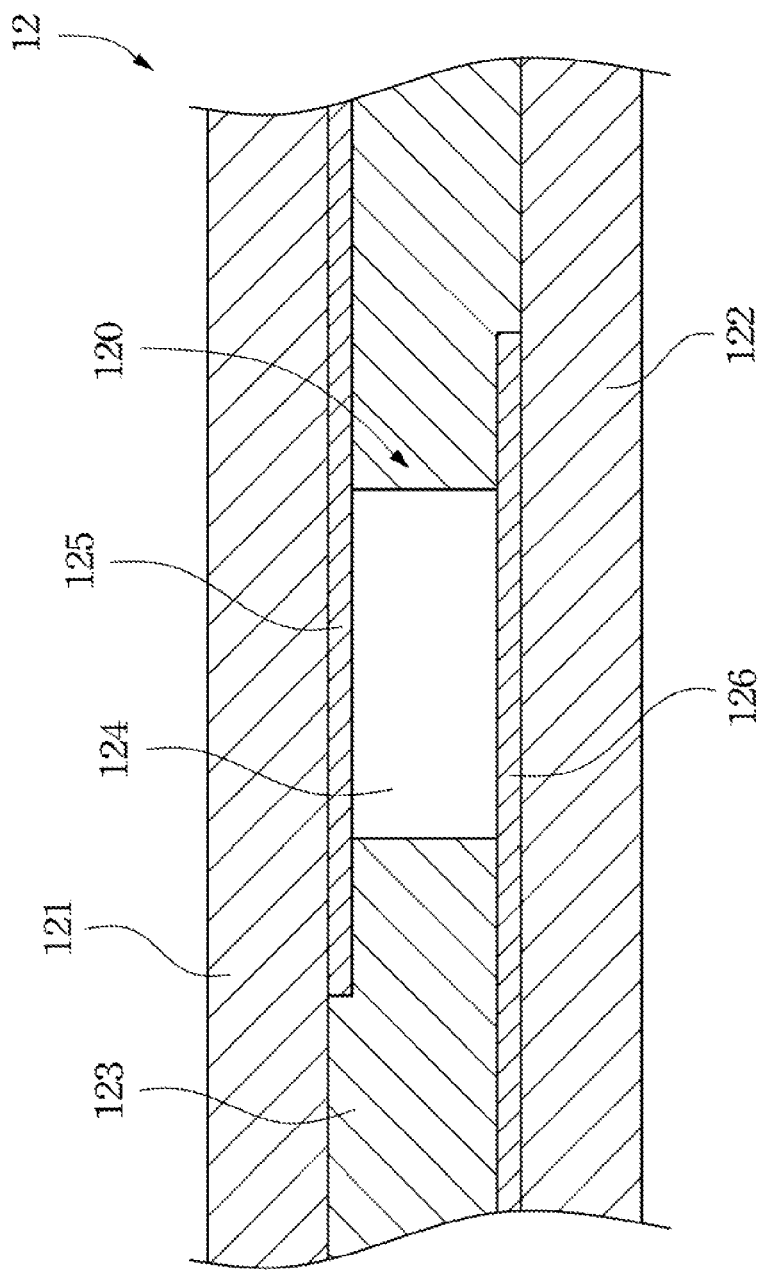
FIG. 3 is a partially enlarged view showing the electric circuit substrate taken from the A portion of FIG. 1, according to the present invention.

Referring to FIG. 1 and FIG. 3, which shows the enlarged part A of the electric circuit substrate 12, and comprises a top membrane 121, a bottom membrane 122 and an insulation layer 123 disposed between the top membrane 121 and the bottom membrane 122. The surface of the bottom membrane 122 facing the top membrane 121 is installed with a bottom electrode 126, the surface of the top membrane 121 facing the bottom membrane 122 is installed with a top electrode 125, and the insulation layer 123 is formed with a hole 124 in which a part of the top electrode 125 and a part of the bottom electrode 126 are exposed from the hole 124, thus, a membrane switch 120 is formed by the top electrode 125 and the bottom electrode 126 corresponding to the location of the hole 124.

FIG. 3 only shows a hole 124 and a membrane switch 120 serving for the purpose of illustration according the present invention. In practice, the insulation layer 123 can be formed with a plurality of holes 124, and each hole 124 is respectively corresponding to a top electrode 125 and a bottom electrode 126 for forming a plurality of membrane switches 120. When the top membrane 121 is pressed such that the top electrode 125 is in contact with the bottom electrode 126 through the hole 124, thus, an electrical connection is formed for outputting a key signal. Referring to FIG. 1, FIG. 2 and FIG. 3 again, the backlight module 2 of the light-emitting keyboard provided by the present invention comprises a flexible light guide plate 21, a flexible reflection unit 22 and a light source 23. In one preferred embodiment of the present invention, the light source 23 is a light emitting diode (LED), the light guide plate 21 is made of an optical material having good light conductive property and formed in a plate shape having a proper thickness, and at least one lateral side thereof is defined as a light incident surface 211, and a surface thereof is defined as a light output surface 212, the other surface opposite to the light output surface 212 is defined as a rear surface 213. The light guide plate 21 is formed with a plurality of penetrated holes 215 corresponding to the locations of the electric switches 120 on the electric circuit substrate 12. The reflection unit 22 is a membrane, and at least one lateral surface thereof is served as a reflection surface 222 for reflecting light, and the reflection surface 222 can be in white color or formed as a mirror surface, or any other surface suitable for reflecting light. The reflection unit 22 is disposed between the light guide plate 21 and the electric circuit substrate 12, and formed with a plurality of through holes 221 corresponding to the penetrated holes 215. An elastic element 24 is respectively installed in each corresponding penetrated hole 215 and through hole 221. When each of the elastic elements 24 is installed in the corresponding penetrated hole 215 and the through hole 221, an adhesive agent or other adhesive member can be used to adhere and fasten the penetrated hole 215, the through hole 221 and the elastic element 24; or the elastic element 24 can be in a moveable state in the penetrated hole 215 and the through hole 221 without applying the adhesive agent or other adhesive member. The adhesive agent or other adhesive member can be provided between the rear surface 213 of the light guide plate 21 and the reflection surface 222 of the reflection unit 22 for mutually adhering, or the adhesive agent or other adhesive member is not used.

The present invention further comprises a base 3 having a bottom part 31 and a lateral wall 32 connected to a lateral side of the bottom part 31 and upwardly extended. The mentioned key module 1 and the backlight module 2 are installed on the bottom part 31 of the base 3, and the lateral wall 32 is provided for restraining the periphery of the key module 1 and the backlight module 2, thereby forming a light-emitting keyboard device. The assembly method is that the electric circuit substrate 12 is firstly disposed on the bottom part 31 of the base 3, then the reflection unit 22 is installed on the rear surface 213 of the light guide plate 21, so the penetrated holes 215 are corresponding to the through holes 221, then the light guide plate 21 and the reflection unit 22 are both disposed on the bottom part 31 of the base 3, then an elastic element 24 is respectively installed in every corresponding penetrated hole 215 and the through hole 221, so each elastic element 24 is respectively corresponding to an electric switch 120, and the light source 23 electrically connected to the electric circuit substrate 12 is corresponding to the light incident surface 211 of the light guide plate 21, lastly, the key part 11 is installed on the light guide plate 21 for enabling the bottom of the key part 11 to face the light output surface 212. When the key membrane 110 having a plurality of key caps 111 on the top surface is adopted as an embodiment according to the present invention, the key membrane 110 covers the lateral wall 32 and a part of the bottom part 31 of the base 3.

When a user operates the key part 11 to press one of the key caps 111, the protrusion 112 below the key cap 111 is in contact with the light guide plate 21 and the reflection unit 22, so as to force the elastic element 24 to be deformed and to transmit the pressing force to the top membrane 121 of the electric circuit substrate 12 for enabling the top electrode 125 (FIG. 3) to be in contact with the bottom electrode 126 through the hole 124 and for forming an electrical connection, thereby a key signal is outputted. When the pressing force applied on the key cap 111 is released, the compressed elastic element 24 enables the reflection unit 22 and the light guide plate 21 to bounce such that the reflection unit 22, the light guide plate 21 and the key part 11 are recovered to the original positions, and the top membrane 121 of the electric circuit substrate 12 is recovered to the original state through the self elasticity, thereby the top electrode 125 and the bottom electrode 126 are separated for breaking the electrical connection.

When the light source 23 is electrically charged to emit light, the lights are projected from the light incident surface 211 at the lateral side of the light guide plate 21 into the light guide plate 21 for being transmitted, the lights can be directly emitted out from the light output surface 212 and the key part 11, or the lights can be reflected by the reflection surface 222 of the reflection unit 22 for passing through the light output surface 212 and the key part 11, thereby the lights can be outputted with minimum medium obstruction for obtaining the maximum output of light quantity, the light emitting efficiency of the keyboard device is therefore increased.

Figure 4:
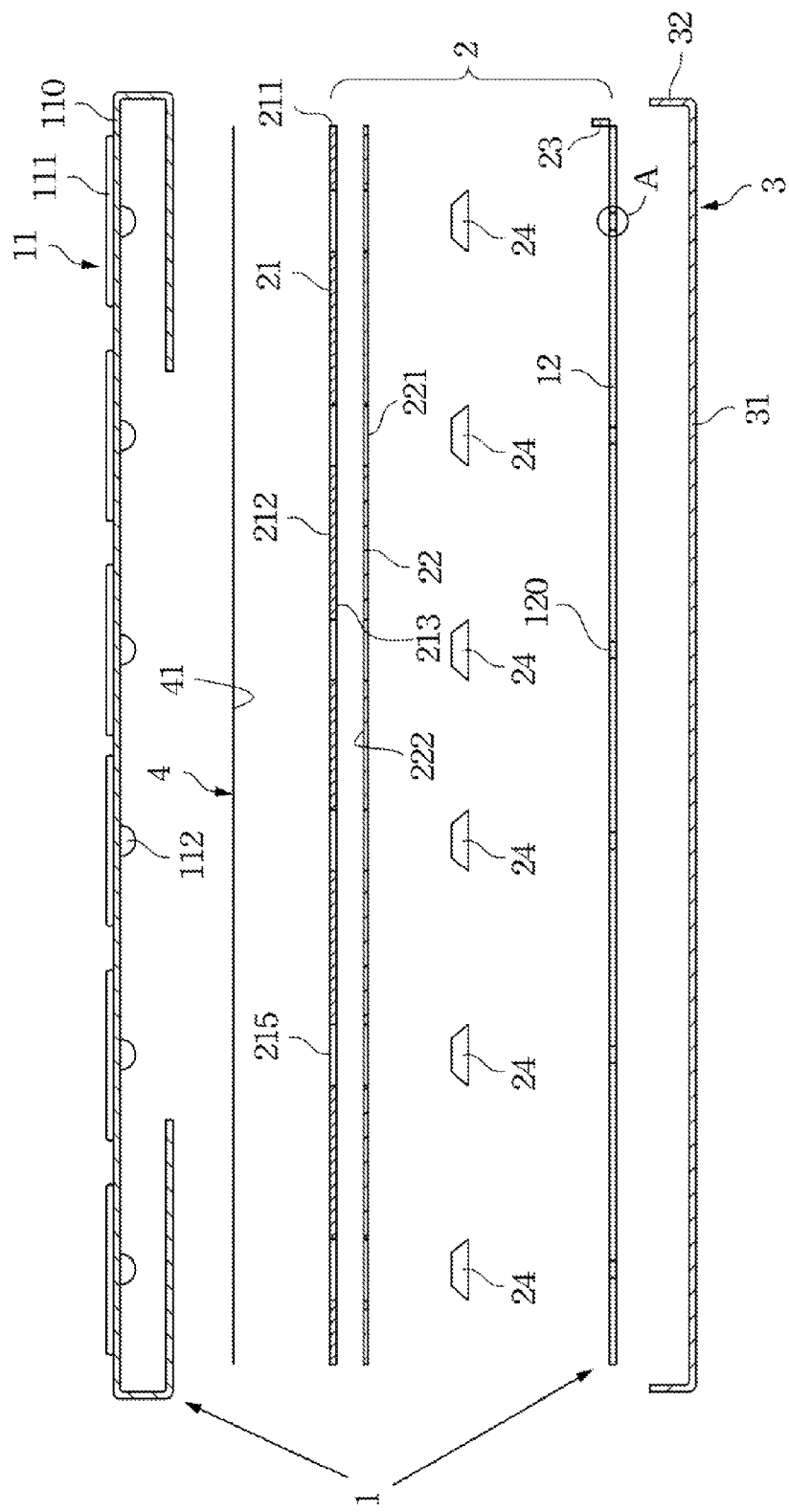
FIG. 4 is a plane cross exploded view showing another alternative of the keyboard according to the first embodiment of the present invention.

Referring to FIG. 4, which is a plane cross exploded view showing another alternative of the keyboard according to the first embodiment of the present invention. The light output surface 212 of the light guide plate 21 is installed with at least one fixing unit, an adhesive member 41 (e.g. an adhesive tape or glue) of the membrane 4 is adopted herein for illustration and not served as a limitation. The adhesive member 41 of the membrane 4 is adhered on the light output surface 212 of the light guide plate 21 or coated at the peripheries of the penetrated holes 215, such that the elastic elements 24 exposed in the penetrated holes 215 are adhered by the adhesive member 41 provided at the locations corresponding to the penetrated holes 215. As such, the elastic element is prevented from shaking or displacing in the through hole or penetrated hole 215, thereby dislocation is avoided.

Figure 5:
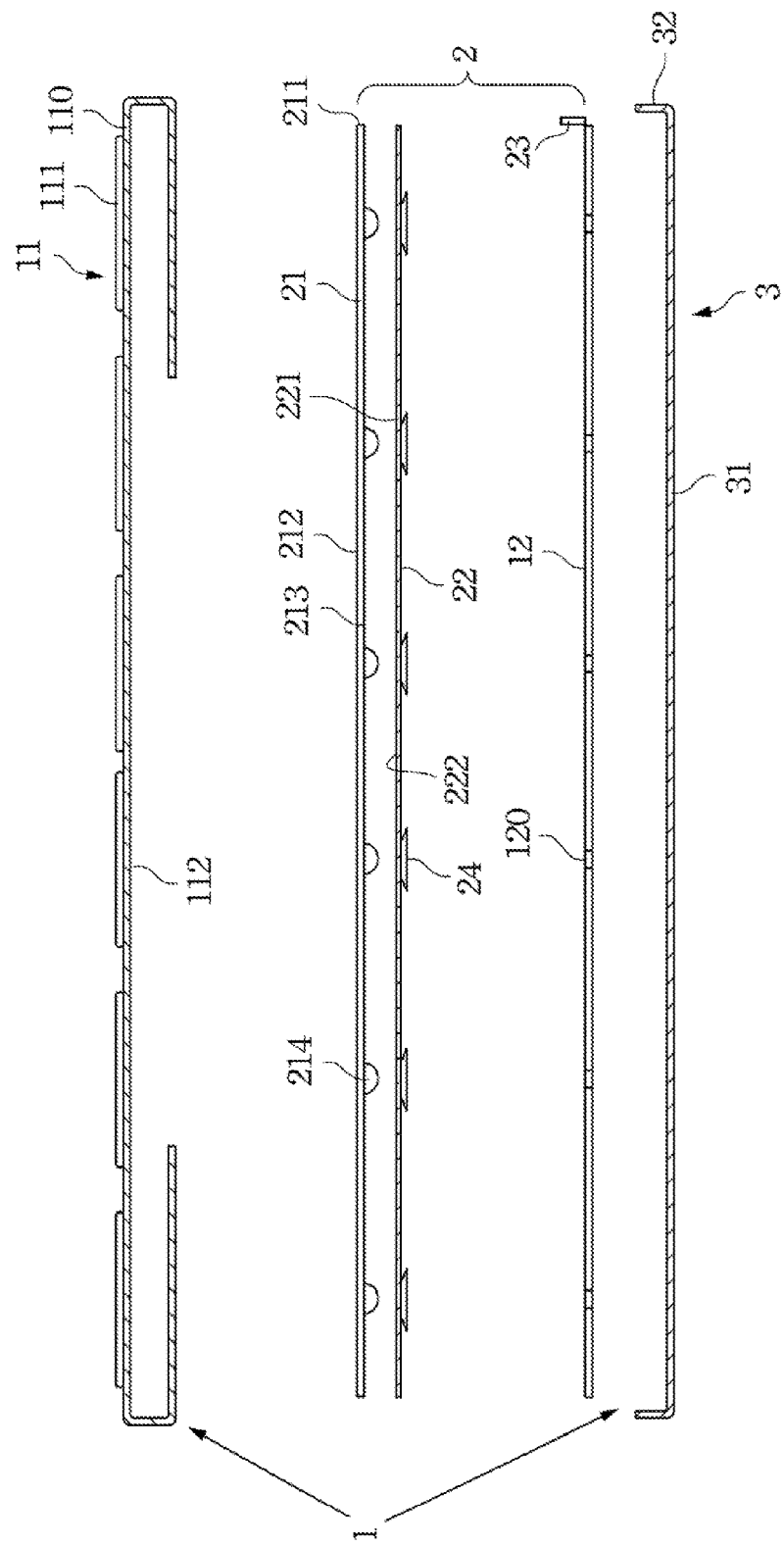
FIG. 5 is a plane cross exploded view showing the assembly relation of main components of the light-emitting keyboard according to the second embodiment of the present invention.
Figure 6:
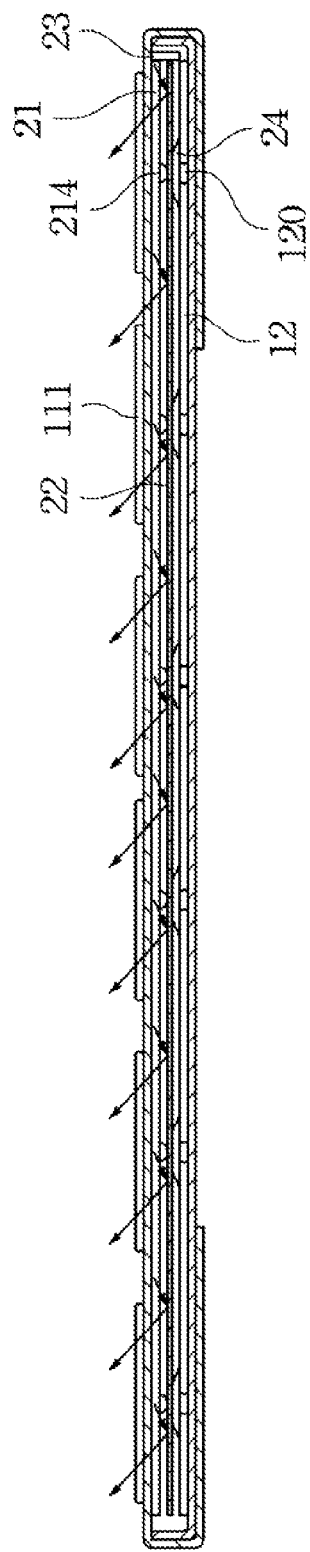
FIG. 6 is a plane cross view showing the assembly structure of the light-emitting keyboard according to the second embodiment of the present invention.

FIG. 5 and FIG. 6 disclose the second embodiment of the light-emitting keyboard according to the present invention, which are provided with the structures substantially similar to the first embodiment; however, the rear surface of the reflection unit 22 is installed with a plurality of elastic elements 24 corresponding to the locations of the electric switches 120 of the electric circuit substrate 12; the method to combine the elastic elements 24 and the reflection unit 22 are to utilize an adhesive agent or other adhesive member to adhere to elastic elements 24 on the rear surface of the reflection unit 22. The reflection unit 22 can be a membrane, and at least one lateral side thereof is defined as a reflection surface 222 for reflecting light. The rear surface 213 of the light guide plate 21 is formed with a plurality of protrusions 214 corresponding to the locations of the elastic elements 24. The light output surface 212 of the mentioned light guide plate 21 and the bottom surface of the key part 11 can also be adhered through the adhesive agent or other adhesive member, or without the adhesive agent or other adhesive member.

According to the second embodiment, the key module 1 and the backlight module 2 are installed on the bottom part 31 of the base 3, and the lateral wall 32 is provided for restraining the periphery of the key module 1 and the backlight module 2, for forming a keyboard device capable of emitting light. The assembly method is that: the electric circuit substrate 12 is firstly installed on the bottom part 31, then the reflection unit 22 installed with the elastic elements 24 is disposed on the electric circuit substrate 12, so each elastic element 24 is respectively corresponding to an electric switch 120, then the light guide plate 12 is installed on the reflection unit 22, such that the reflection surface 222 can face the rear surface 213 of the light guide plate 21. The light source 23 electrically connected to the electric circuit substrate 12 is corresponding to the light incident surface 211 of the light guide plate 21. Lastly the key part 11 is installed on the light guide plate 21 such that the bottom surface of the key part 11 is enabled to face the light output surface 212.

Figure 7:
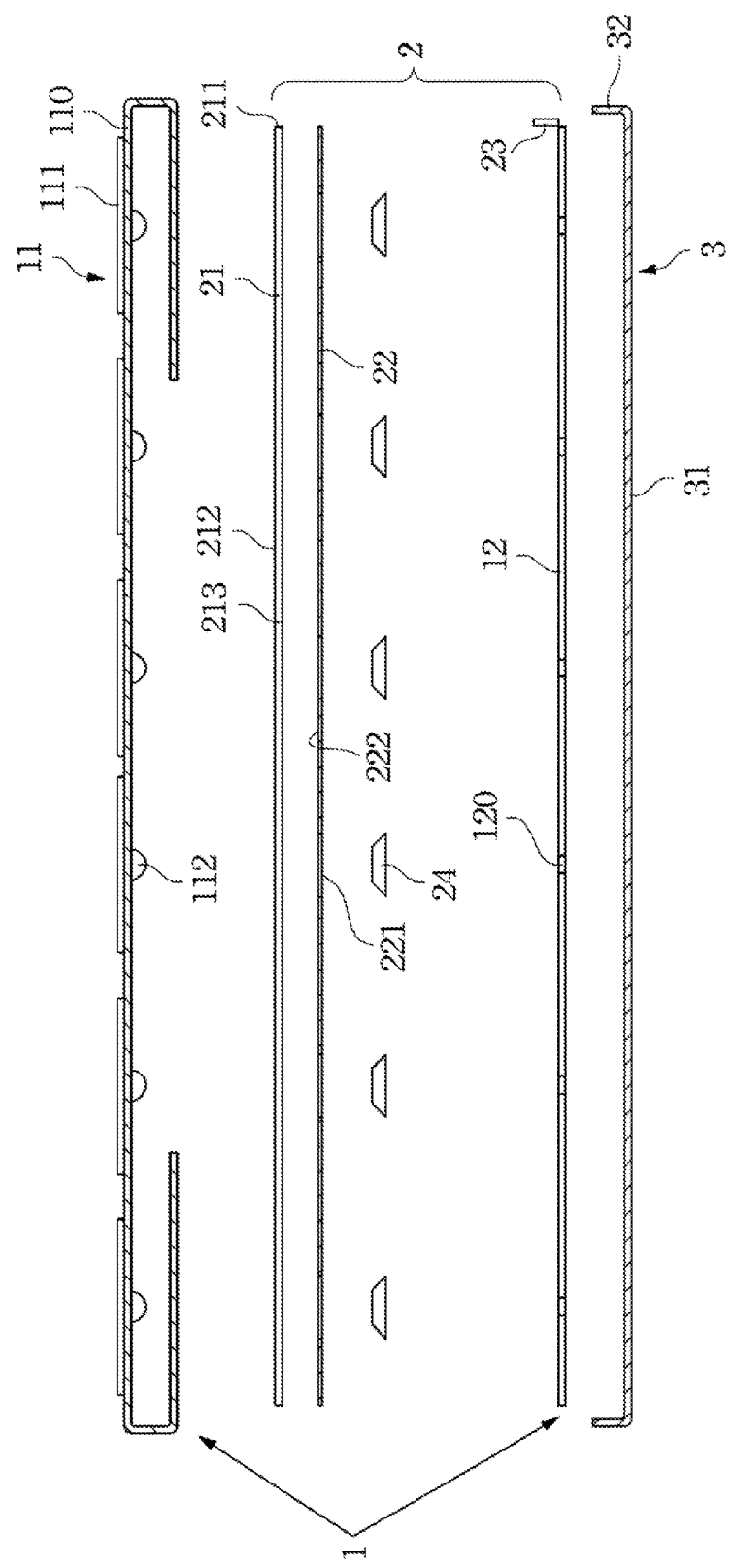
FIG. 7 is a plane cross exploded view showing the assembly relation of main components of the light-emitting keyboard according to the third embodiment of the present invention.
Figure 8:
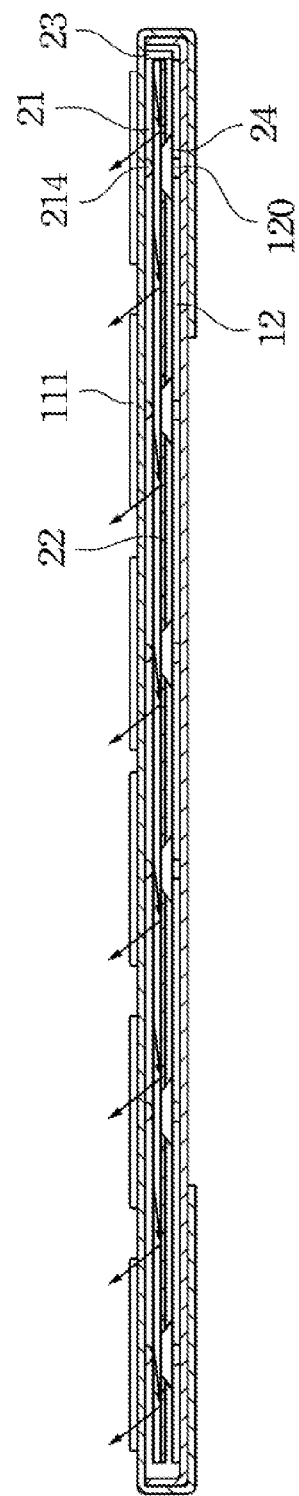
FIG. 8 is a plane cross view showing the assembly structure of the light-emitting keyboard according to the third embodiment of the present invention.

When a user operates to key part 11 to press one of the key caps 111, the bottom of the key cap 111 is in contact with the light guide plate 21, so the protrusion 214 presses the elastic element 24 below the reflection unit 22 to deform, and the pressing force transmitted to the electric circuit substrate 12 for actuating the electric switch 120 for forming an electrical connection thereby a key signal is outputted. When the pressing force applied on the key cap 111 is released, the compressed elastic element 24 allows the reflection unit 22 and the light guide plate 21 to bounce, and the reflection unit 22, the light guide plate 21 and the key part 11 are recovered to the original positions, the electric switch 120 is also recovered to the original state through the self elasticity for breaking the electrical connection. FIG. 7 and FIG. 8 disclose the third embodiment of the light-emitting keyboard according to the present invention, which have substantially similar structure as the first embodiment; however the light guide plate 21 is not formed with penetrated holes, the reflection unit 22 is formed with a plurality of through holes 221 corresponding to the locations of the electric switches 120 of the electric circuit substrate 12, an elastic element 24 is installed in each through hole 221, and the elastic element 24 is connected to the rear surface 213 of the light guide plate 21. The reflection unit 22 can be a membrane, and at least one lateral side thereof is defined as a reflection surface 222 for reflecting light. When the elastic element 24 is installed in the through hole 221, ad adhesive agent or other adhesive member can be used to adhere and fasten between the through hole 221 and the elastic element 24, or the adhesive agent or other adhesive member is not provided for allowing the elastic element 24 to penetrate the through hole 221 to be connected at the rear surface of the light guide plate 21. The adhesive agent or other adhesive member can be provided between the rear surface 213 of the light guide plate 21 and the reflection surface 222 of the reflection unit 22 for mutually adhering, or the adhesive agent or other adhesive member is not used.

According to the third embodiment of the present invention, the key module 1 and the backlight module 2 are installed on the bottom part 31 of the base 3, and the lateral wall 32 is provided for restraining the periphery of the key module 1 and the backlight module 2, thereby forming a light-emitting keyboard device. The assembly method is that the reflection unit 22 is firstly installed on the rear surface 213 of the light guide plate 21, then at the locations of the rear surface corresponding to the through holes 221, the adhesive agent or other adhesive member is used to respectively adhere an elastic element 24 on the rear surface 213 of the light guide plate 21 corresponding to the through holes 221, then the assembled reflection unit 22 and the light guide plate 21 are together installed on the electric circuit substrate 12, so each elastic element 24 is respectively corresponding to an electric switch 120, the light source 23 which is electrically connected to the electric circuit substrate 12 in advance is corresponding to the light incident surface 211 of the light guide plate 21, lastly the key part 11 is installed on the light guide plate 21, and the bottom surface of the key part 11 faces the light output surface 212.

When a user operates the key part 11 to press the key cap 111, the protrusion 112 below the key cap 111 presses the flexible light guide plate 21 and the reflection unit 22, such that the elastic element 24 is deformed to actuate the electric switch 120 forming an electrical connection, thereby a key signal is outputted. When the pressing force applied on the key cap 111 is released, the compressed elastic element 24 enables the reflection unit 22 and the light guide plate 21 to bounce such that the reflection unit 22, the light guide plate 21 and the key part 11 are recovered to the original positions, and the top membrane 121 of the electric circuit substrate 12 is recovered to the original state through the self elasticity for breaking the electrical connection.

Figure 9:
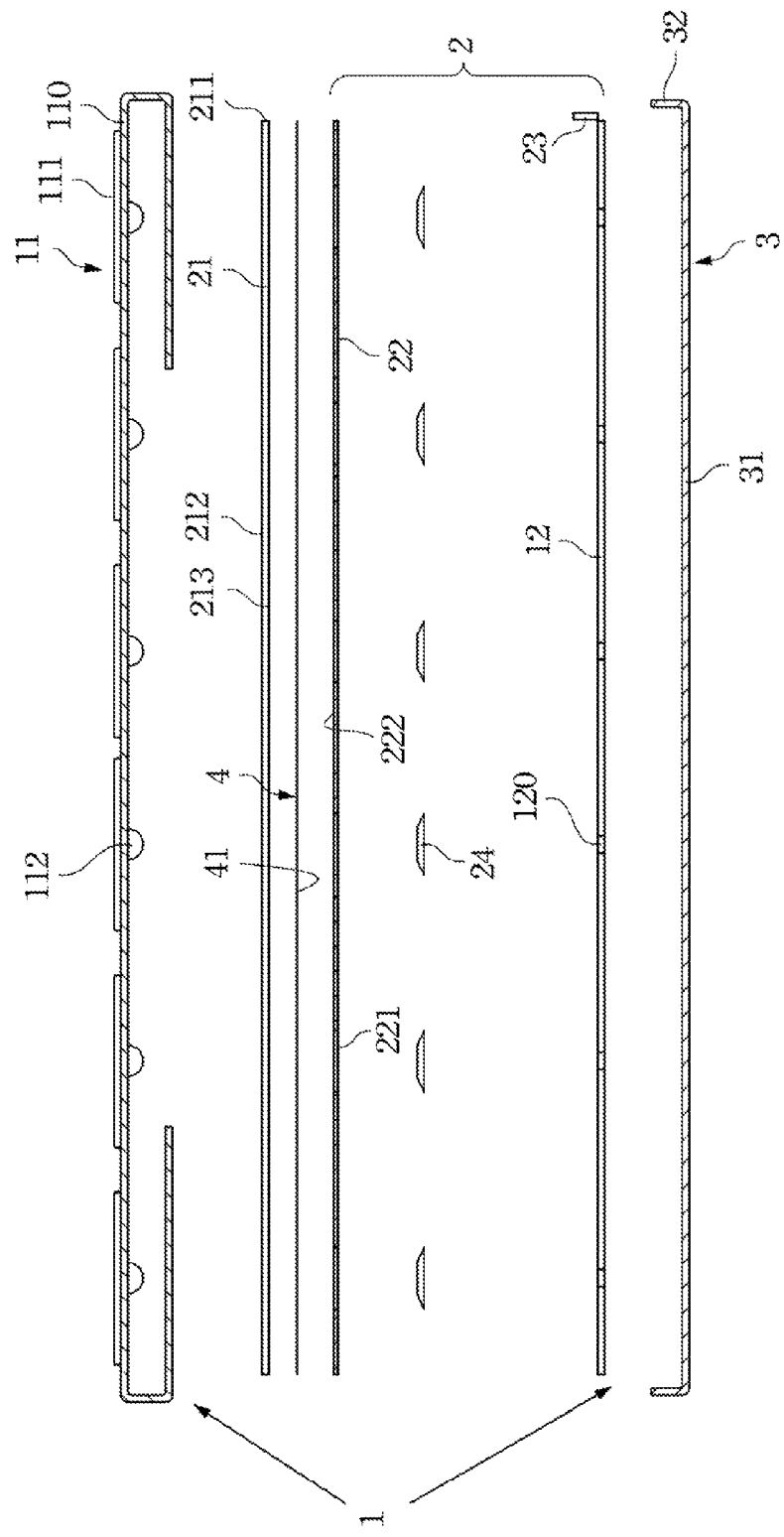
FIG. 9 is a plane cross exploded view showing another alternative of the keyboard according to the third embodiment of the present invention.
Figure 10:
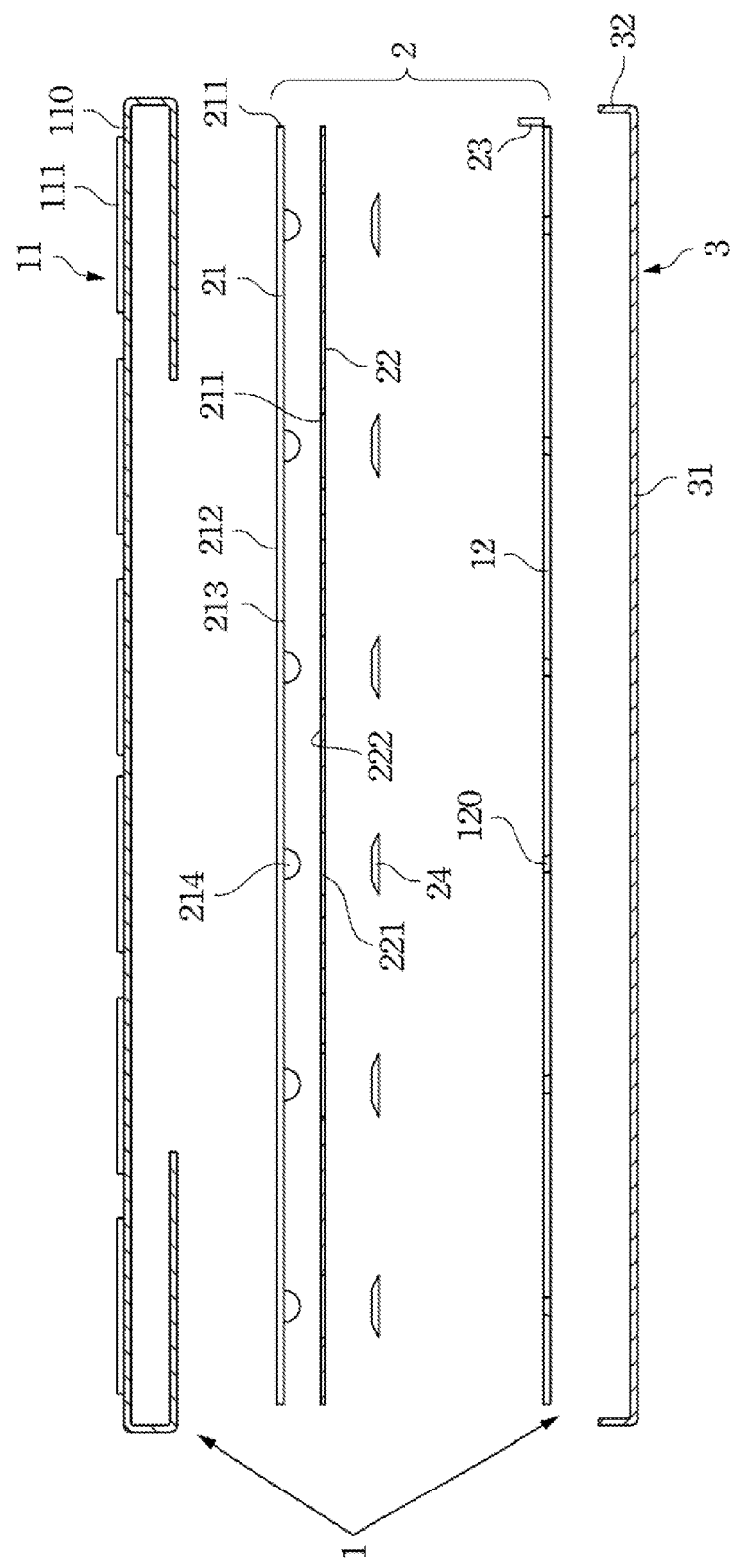
FIG. 10 is a plane cross exploded view showing the assembly relation of main components of the light-emitting keyboard according to the fourth embodiment of the present invention.

Referring to FIG. 9, which is a plane cross exploded view showing another alternative of the keyboard according to the third embodiment of the present invention. At least one fixing unit is installed between the rear surface 213 of the light guide plate 21 and the reflection surface 222 of the reflection unit 22, an adhesive member 41 (e.g. an adhesive tape or glue) of the membrane 4 is adopted herein for illustration and not served as a limitation. The adhesive member 41 of the membrane 4 is provided for adhering and fixing the elastic element 24 in the through hole 221 of the reflection unit 22. As such, the elastic element is prevented from shaking or displacing in the through hole 221, thereby dislocation is avoided. FIG. 10 discloses the fourth embodiment of the light-emitting keyboard according to the present invention, which is provided with the structures substantially similar to the second embodiment; however, the reflection unit 22 is installed with a plurality of through holes 221 corresponding to the locations of the electric switches 120 of the electric circuit substrate 12, an elastic element 24 is installed in each through hole 221. The light guide plate 21 is not formed with penetrated holes. When the elastic element 24 is installed in the through hole 221, an adhesive agent or other adhesive member can be used to adhere and fasten between the through hole 221 and the elastic element 24; or the adhesive agent or other adhesive member is not provided for allowing the elastic element 24 to be in a moveable state in the through hole 221. When the elastic element 24 is installed in the through hole 221, the reflection surface 222 is provided with an adhesive member such as an adhesive tape, and the elastic element 24 is adhered and fastened on the reflection unit 22. The light output surface 212 of the mentioned light guide plate 21 and the bottom surface of the key part 11 can also be adhered through the adhesive agent or other adhesive member, or the adhesive agent or other adhesive member is not needed. According to the fourth embodiment of the present invention, the key module 1 and the backlight module 2 are installed on the bottom part 31 of the base 3, and the lateral wall 32 is provided for restraining the periphery of the key module 1 and the backlight module 2, thereby forming a light-emitting keyboard device. The assembly method is that the reflection unit 22 is firstly installed on the rear surface 213 of the light guide plate 21, an elastic element 24 is respectively installed in each through hole 221 of the reflection unit 22, then the assembled reflection unit 22, the light guide plate 21 and the elastic element 24 are together installed on the electric circuit substrate 12, so each elastic element 24 is respectively corresponding to an electric switch 120, the light source 23 which is electrically connected to the electric circuit substrate 12 in advance is corresponding to the light incident surface 211 of the light guide plate 21, lastly the key part 11 is installed on the light guide plate 21, and the bottom surface of the key part 11 faces the light output surface 212.

Figure 11:
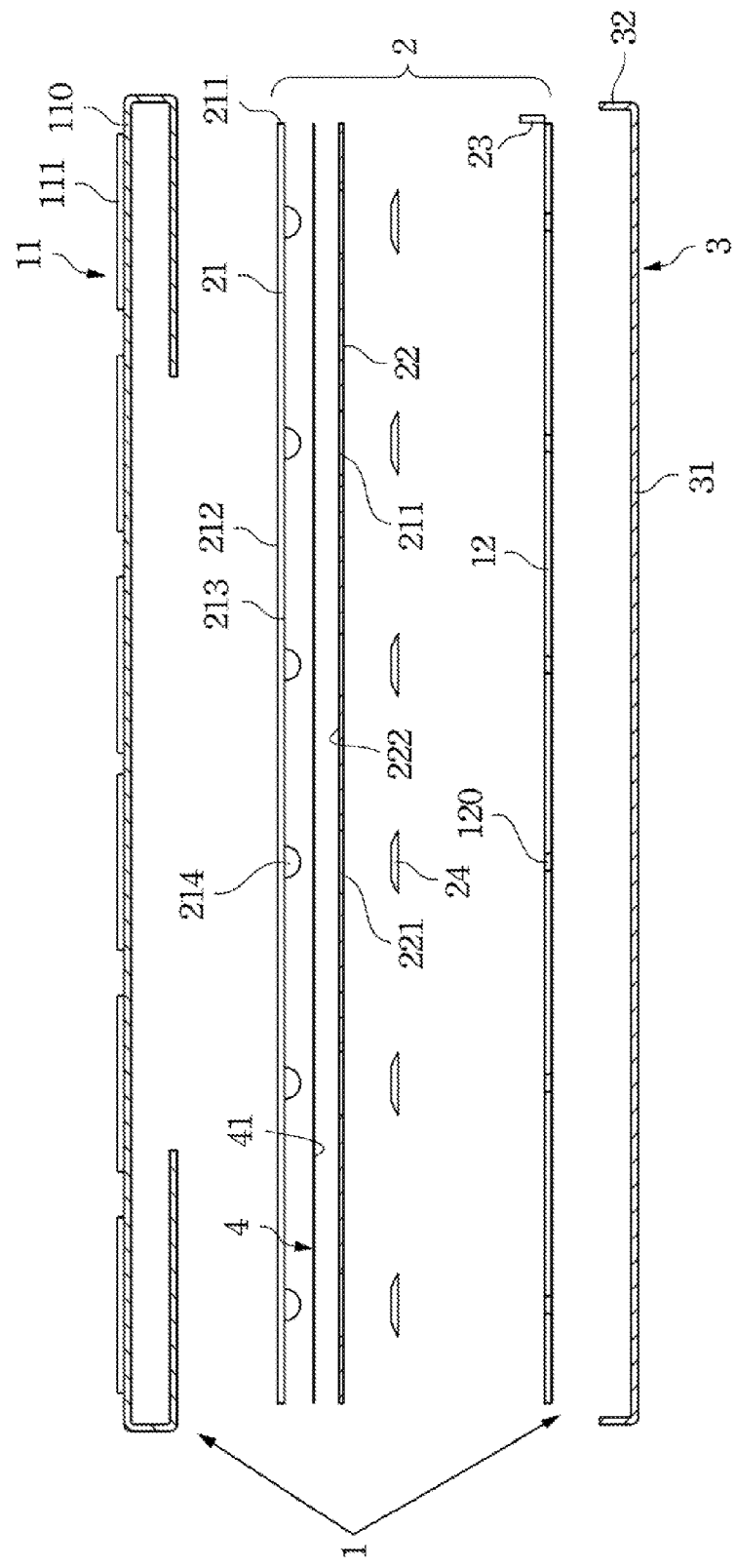
FIG. 11 is a plane cross exploded view showing another alternative of the keyboard according to the fourth embodiment of the present invention.

Referring to FIG. 11, which is a plane cross exploded view showing another alternative of the keyboard according to the fourth embodiment of the present invention. At least one fixing unit is installed between the protrusion 214 of the rear surface 213 of the light guide plate 21, an adhesive member 41 (e.g. an adhesive tape or glue) of the membrane 4 is adopted herein for illustration and not served as a limitation. When the elastic element 24 is installed in the through hole 221 of the reflection unit 22, the membrane 4 having the adhesive member 41 is installed on the reflection surface 222 of the reflection unit 22, so the upper end of the elastic element 24 is adhered and fastened on the reflection unit 22 through the adhesive member 41. As such, the elastic element is prevented from shaking or displacing in the through hole, thereby dislocation is avoided.

Figure 12:
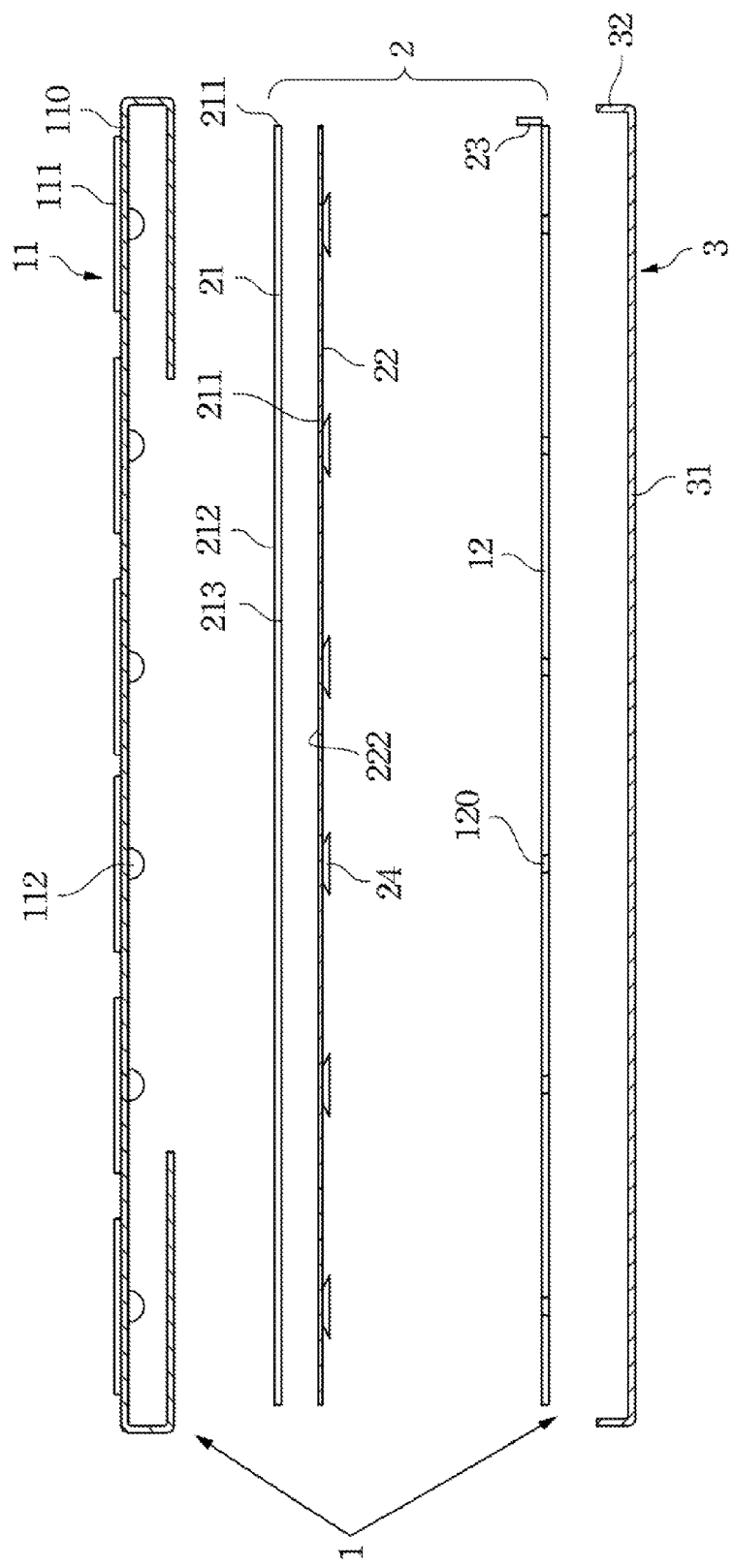
FIG. 12 is a plane cross exploded view showing the assembly relation of main components of the light-emitting keyboard according to the fifth embodiment of the present invention.

FIG. 12 discloses the fifth embodiment of the light-emitting keyboard according to the present invention, which is provided with the structures substantially similar to the second embodiment; however, the rear surface of the reflection unit 22 is installed with a plurality of elastic elements 24 corresponding to the locations of the electric switches 120 of the electric circuit substrate 12; the combination method of the elastic elements 24 and the reflection unit 22 can be utilizing an adhesive agent or other adhesive member to directly adhere to elastic elements 24 on the rear surface of the reflection unit 22. The reflection unit 22 can be a membrane, and at least one lateral side thereof is defined as a reflection surface 222 for reflecting light. The bottom surface of the key part 11 is installed with a plurality of protrusions 112 corresponding to the locations of the elastic elements 24. The adhesive agent or other adhesive member can be provided between the rear surface 213 of the light guide plate 21 and the reflection surface 222 of the reflection unit 22 for mutually adhering, or the adhesive agent or other adhesive member is not used.

According to the fifth embodiment provided by the present invention, the key module 1 and the backlight module 2 are installed on the bottom part 31 of the base 3, and the lateral wall 32 is provided for restraining the periphery of the key module 1 and the backlight module 2, for forming a keyboard device capable of emitting light. The assembly method is that: the electric circuit substrate 12 is firstly installed on the bottom part 31, then the reflection unit 22 installed with the elastic elements 24 is disposed on the electric circuit substrate 12, so each elastic element 24 is respectively corresponding to an electric switch 120, then the light guide plate 12 is installed on the reflection unit 22, such that the reflection surface 222 is enabled to face the rear surface 213 of the light guide plate 21. The light source 23 electrically connected to the electric circuit substrate 12 is corresponding to the light incident surface 211 of the light guide plate 21. Lastly the key part 11 is installed on the light guide plate 21 such that the bottom surface of the key part 11 is enabled to face the light output surface 212.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

Although the present invention has been described with reference to the preferred embodiments thereof, it is apparent to those skilled in the art that a variety of modifications and changes may be made without departing from the scope of the present invention which is intended to be defined by the appended claims.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A keyboard, comprising:
   a key module comprising:
      a key membrane having a space therein;
      a plurality of light-transmissive key caps disposed on the key membrane; and
      a reflection membrane received in the space, and formed with a plurality of through holes;
   a backlight module comprising:
      a light guide plate received in the space, disposed between the key membrane and the reflection membrane, and formed with penetrated holes respectively corresponding to one of the through holes;
   a plurality of elastic elements received in the space;
   at least one adhesive membrane received in the space, covering on a light output surface of the light guide plate being opposite to the reflection membrane, and respectively fixing each of the elastic elements in one of the penetrated holes; and
   an electric circuit substrate received in the space, disposed on a surface of the reflection membrane being opposite to the light guide plate, and formed with a plurality of electric switches respectively corresponding to one of the elastic elements.

2. The keyboard as claimed in claim 1, wherein the adhesive membrane is a membrane having an adhesive member covering the light output surface of the light guide plate, the membrane is installed on the light guide plate, and the elastic elements are adhered by the adhesive member.

3. The keyboard as claimed in claim 2, wherein the membrane is an adhesive tape provided on the light output surface of the light guide plate, so the elastic elements are adhered in the penetrated holes.

4. The keyboard as claimed in claim 2, wherein the adhesive member is a glue.

5. The keyboard as claimed in claim 1, wherein a surface of the key membrane opposite to the light-transmissive key caps is installed with a plurality of protrusions corresponding to the elastic elements.

6. The keyboard as claimed in claim 1, wherein the backlight module comprises at least one light source, the light source is electrically connected to the electric circuit substrate, and the light source projects lights into the light guide plate from a light incident surface of the light guide plate.

7. The keyboard as claimed in claim 1, wherein the reflection membrane is disposed between the light guide plate and the electric circuit substrate.

8. The keyboard as claimed in claim 7, wherein the penetrated holes and the through holes both correspond to the electric switches, respectively, and each of the corresponding penetrated hole and the through hole are installed with one of the elastic elements therein.

9. The keyboard as claimed in claim 1, wherein the light-transmissive key caps is disposed on an outer surface of the key membrane.

10. The keyboard as claimed in claim 9, wherein an inner surface of the key membrane is opposite to the outer surface of the key membrane, and installed with a plurality of protrusions corresponding to the elastic elements.

11. The keyboard as claimed in claim 10, wherein the adhesive membrane is disposed between the light guide plate and the protrusions.

12. The keyboard as claimed in claim 1, wherein a surface of the reflection membrane facing the electric circuit substrate is connected with the elastic elements corresponding to the electric switches.

13. The keyboard as claimed in claim 1, wherein the through holes correspond to the electric switches, respectively, and the elastic elements are installed in the through holes, respectively.

\* \* \* \* \*